United States Patent
Kawamoto et al.

(10) Patent No.: US 9,599,054 B2
(45) Date of Patent: *Mar. 21, 2017

(54) VEHICLE-DRIVING DEVICE AND VEHICLE-DRIVING METHOD

(75) Inventors: Yoshinobu Kawamoto, Atsugi (JP); Masahiro Iriyama, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 359 days.

This patent is subject to a terminal disclaimer.

(21) Appl. No.: 14/344,820

(22) PCT Filed: Jul. 17, 2012

(86) PCT No.: PCT/JP2012/068107
§ 371 (c)(1),
(2), (4) Date: Mar. 13, 2014

(87) PCT Pub. No.: WO2013/038798
PCT Pub. Date: Mar. 21, 2013

(65) Prior Publication Data
US 2014/0373809 A1    Dec. 25, 2014

(30) Foreign Application Priority Data

Sep. 14, 2011    (JP) .................. 2011-200190

(51) Int. Cl.
*F02D 41/00*      (2006.01)
*F02D 41/12*      (2006.01)
(Continued)

(52) U.S. Cl.
CPC ......... *F02D 41/123* (2013.01); *B60W 10/026* (2013.01); *B60W 10/06* (2013.01);
(Continued)

(58) Field of Classification Search
CPC ...... F02D 41/12; F02D 41/123; F02D 41/126; F02D 41/005
(Continued)

(56) References Cited

U.S. PATENT DOCUMENTS 7,055,635 B2 *   6/2006   Itoh .................. B60K 6/48
                                                180/65.25
9,297,323 B2 *   3/2016   Kawamoto .......... B60W 10/02
(Continued)

FOREIGN PATENT DOCUMENTS

CN       1629520 A        6/2005
EP       1 227 230 A2     7/2002
(Continued)

OTHER PUBLICATIONS

USPTO Notice of Allowance, U.S. Appl. No. 14/344,813, Nov. 19, 2015, 9 pages.
(Continued)

*Primary Examiner* — Mahmoud Gimie
(74) *Attorney, Agent, or Firm* — Foley & Lardner LLP (57) ABSTRACT

When an accelerator pedal is released while a vehicle is running, a lockup clutch is unlocked. Simultaneously, ignition timing is retarded and a fuel-cut operation to stop fuel supply to an internal combustion engine is performed. However, when it is predicted that a fuel recovery is to be performed after unlocking the lockup clutch, execution of the fuel-cut operation is prohibited. A shock due to the fuel recovery after the fuel-cut operation performed when the accelerator pedal is released is thereby prevented.

8 Claims, 8 Drawing Sheets

(51) Int. Cl.
*B60W 10/06* (2006.01)
*F02D 41/02* (2006.01)
*F02P 5/15* (2006.01)
*F16H 61/14* (2006.01)
*F16H 63/50* (2006.01)
*B60W 10/02* (2006.01)
*F02D 33/00* (2006.01)
*F16H 59/18* (2006.01)
*B60W 30/18* (2012.01)

(52) U.S. Cl.
CPC ......... *F02D 33/006* (2013.01); *F02D 41/005* (2013.01); *F02D 41/022* (2013.01); *F02D 41/12* (2013.01); *F02D 41/126* (2013.01); *F02P 5/1504* (2013.01); *F16H 61/143* (2013.01); *F16H 63/50* (2013.01); *B60W 2030/1809* (2013.01); *B60W 2510/0695* (2013.01); *B60Y 2300/46* (2013.01); *F02D 2200/101* (2013.01); *F02D 2200/602* (2013.01); *F02D 2400/12* (2013.01); *F16H 2059/186* (2013.01); *Y02T 10/46* (2013.01)

(58) Field of Classification Search
USPC .......... 123/332, 493, 198 F; 701/54, 70, 112
See application file for complete search history.

(56) References Cited

U.S. PATENT DOCUMENTS

| 2005/0137059 A1 | 6/2005 | Takahashi |
| 2010/0131160 A1 | 5/2010 | Ayabe et al. |
| 2010/0250074 A1 | 9/2010 | Hirasako et al. |
| 2011/0154931 A1 | 6/2011 | Wright et al. |

FOREIGN PATENT DOCUMENTS

| JP | 8-285074 A | 11/1996 |
| JP | 2005-313831 A | 11/2005 |
| JP | 2006-15819 A | 1/2006 |
| JP | 2007-146965 A | 6/2007 |

OTHER PUBLICATIONS

USPTO Office Action, U.S. Appl. No. 14/344,813, Jul. 15, 2015, 12 pages.

* cited by examiner

VEHICLE-DRIVING DEVICE AND VEHICLE-DRIVING METHOD

FIELD OF THE INVENTION

This invention relates to a driving force control in a vehicle having a stepped automatic transmission.

BACKGROUND OF THE INVENTION

In a vehicle in which an output rotation of the internal combustion engine is transmitted to drive wheels via a torque converter having a lockup clutch, and a stepped automatic transmission, for example, the following method is employed to suppress fuel consumption. Specifically, if an accelerator pedal is released during a vehicle running, the lockup clutch is unlocked, and a fuel supply to the internal combustion engine is stopped.

As a rotation speed of the internal combustion engine decreases as a result of stopping the fuel supply, the fuel supply to the internal combustion engine is resumed. Stopping the fuel supply to the internal combustion engine is called a "fuel-cut," and resumption of the fuel supply to the internal combustion engine is called a "fuel recovery" or simply a "recovery."

In order to prevent a difference of timings between a fuel recovery operation and a lockup clutch unlock operation from generating a torque shock, JP 2006-015819 A, published by The Japan Patent Office in 2006, proposes to apply a regenerative braking at the time of the fuel recovery operation.

SUMMARY OF THE INVENTION

However, it is not possible to apply a torque shock prevention device of the prior art to a vehicle not provided with a regenerative brake system.

It is therefore an object of this invention to prevent a torque shock caused by the fuel recovery operation during a vehicle coasting without applying a regenerative brake.

In order to achieve the above object, this invention applies to a vehicle-driving device comprising an internal combustion engine, a torque converter provided with a lockup clutch and an automatic transmission, which are arranged in a power transmission path from the internal combustion engine to a drive wheel.

The vehicle-driving device comprises a programmable controller programmed to perform a fuel-cut operation of the internal combustion engine and an unlock operation of the lockup clutch as the accelerator pedal is released during a vehicle running, predict if a fuel recovery operation is performed as a result of the fuel-cut operation and the unlock operation, and prohibit the fuel-cut operation when the fuel recovery operation is predicted to be performed as a result of the fuel-cut operation and the unlock operation.

The details as well as other features and advantages of this invention are set forth in the remainder of the specification and are shown in the accompanying drawings.

DESCRIPTION OF THE PREFERRED EMBODIMENTS

Figure 1:
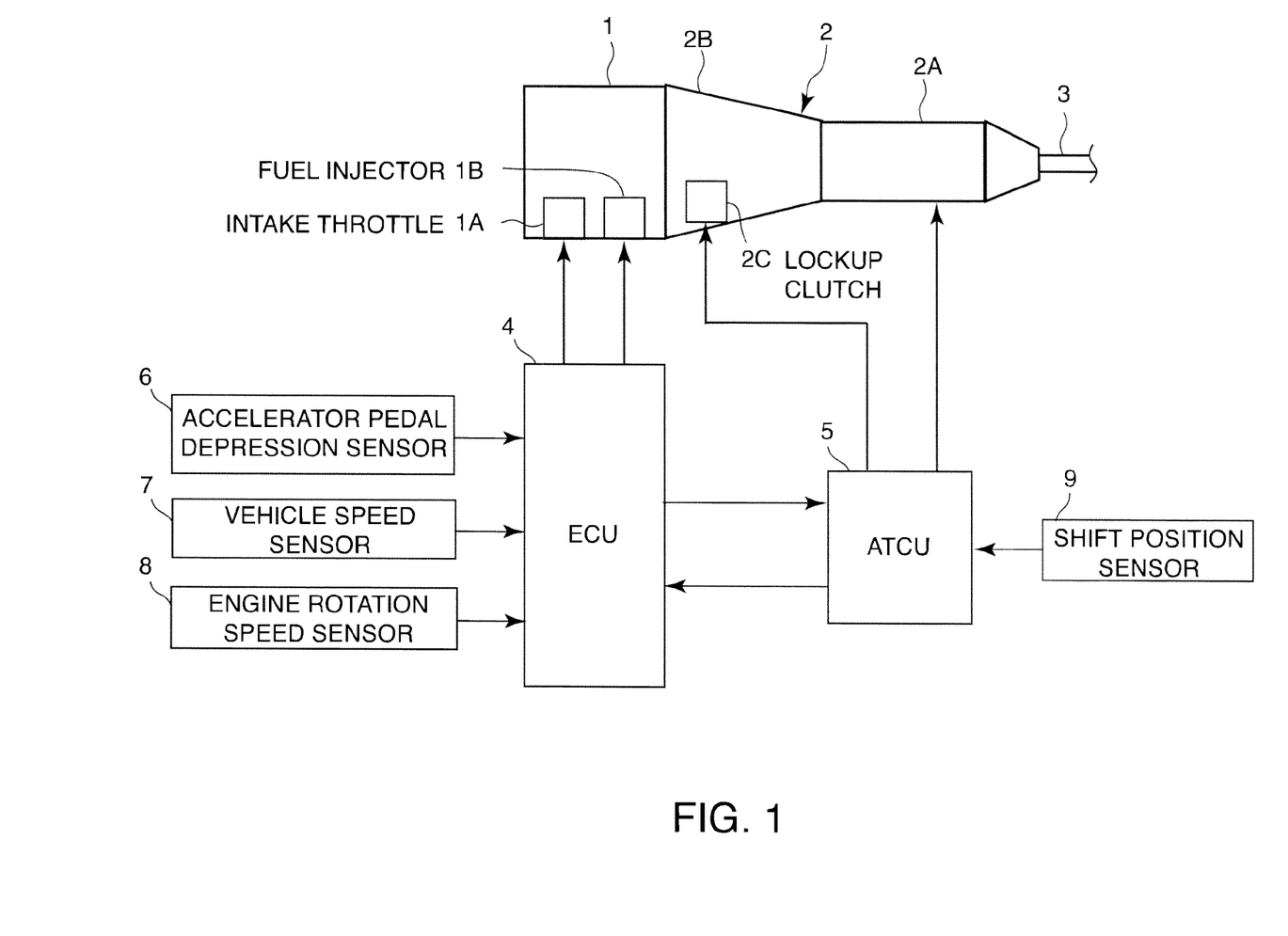
FIG. 1 is a schematic diagram illustrating a vehicle-driving device according to this invention.

Referring to FIG. 1 of the drawings, a vehicle-driving device according to this invention comprises an internal combustion engine 1 and a speed change unit 2 that transmits a rotation output from the internal combustion engine 1 to a propeller shaft 3 after changing a rotation speed thereof.

The internal combustion engine 1 has an intake throttle 1A and a fuel injector 1B.

The speed change unit 2 has a torque converter 2B, an automatic transmission 2A that changes an output rotation of the torque converter 2B, and a hydraulic lockup clutch 2C.

The torque converter 2B comprises a pump impeller coupled to a rotation shaft of the internal combustion engine 1 and a turbine runner coupled to an input shaft of the automatic transmission 2A. The torque converter 2B transmits a torque using a hydraulic fluid between the pump impeller and the turbine runner. The automatic transmission 2A comprises a planetary gear set having a high clutch and a low brake.

The lockup clutch 2C directly couples the pump impeller and the turbine runner when it is in a lockup state. When the lockup clutch 2C is unlocked, a relative rotation between the pump impeller and the turbine runner is allowed.

The lockup and unlock operations of the lockup clutch 2C and engagement/disengagement of the high clutch and the low brake of the automatic transmission 2A are controlled by an automatic transmission controller (ATCU) 5 using a pumping pressure of a hydraulic pump provided as an accessory of the internal combustion engine 1.

An opening of the intake throttle 1A for adjusting an intake air amount of the internal combustion engine 1, a fuel injection by the fuel injector 1B of the internal combustion engine 1, and an ignition timing of the injected fuel are respectively controlled by the engine controller (ECU) 4.

Each of the ECU 4 and the ATCU 5 is constituted by a microcomputer comprising a central processing unit (CPU), a read-only memory (ROM), a random access memory (RAM), and an input/output interface (I/O interface). One or both of the ECU 4 and the ATCU 5 may comprise a plurality of microcomputers. Alternatively, the ECU 4 and the ATCU 5 may be integrated into a single microcomputer.

The ECU 4 receives, via a signal circuit, detection data from an accelerator pedal depression sensor 6 that detects a depression amount (accelerator opening) of an accelerator pedal of a vehicle, a vehicle speed sensor 7 that detects a vehicle running speed, and an engine rotation speed sensor 8 that detects an engine rotation speed of the internal combustion engine 1.

The ATCU 5 receives detection data from a shift position sensor 9 that detects a shift position of a selector lever provided in a vehicle via a signal circuit.

The ECU 4 and the ATCU 5 are connected to each other via a control area network (CAN) communication.

In the configuration described above, as the accelerator pedal is released while the lockup clutch 2C is locked, the ATCU 5 outputs a signal for instructing an unlock operation of the lockup clutch 2.

Next, a summary of the driving force control in this vehicle-driving device will be described.

The ATCU 5 controls lockup and unlock operations of the lockup clutch 2C and a speed change of the automatic transmission 2A depending on a vehicle-driving condition such as an accelerator opening and a vehicle speed.

The ECU 4 controls fuel injection of the internal combustion engine 1 depending on a driving condition such as an accelerator opening. When the accelerator opening is not zero, that is, when the accelerator pedal is depressed, the ECU 4 controls the fuel injection amount depending on the accelerator opening. This is called a typical fuel injection control. Meanwhile, when the accelerator opening is zero, that is, when the accelerator pedal is released, the ECU 4 performs a fuel-cut operation or a fuel recovery operation.

Which of the fuel-cut operation or the fuel recovery operation is performed by the ECU 4 is determined based on the engine rotation speed in order to avoid a so-called engine stall generated when the engine rotation speed decreases such that an autonomous engine rotation cannot be maintained.

When the engine rotation speed is equal to or higher than a recovery rotation speed while the accelerator opening is zero, the ECU 4 performs the fuel-cut operation. When the engine rotation speed is lower than the recovery rotation speed while the accelerator opening is zero, the ECU 4 performs the fuel recovery operation.

The recovery rotation speed is set to a different value depending on a condition of the lockup clutch 2C.

The recovery rotation speed is set to a different value because a decrease rate of the engine rotation speed caused by the fuel-cut operation is different depending on which of a lockup state (L/U ON) or an unlock state (L/U OFF) the lockup clutch 2C has. Specifically, the decrease rate of the engine rotation speed caused by the fuel-cut operation is higher in the L/U OFF state than that in the L/U ON state. In order to avoid an engine stall, it is necessary to set the L/U OFF recovery rotation speed to be higher than the L/U ON recovery rotation speed.

Herein, the recovery rotation speed in the L/U ON state is set at 800 rotations per minute (rpm). The recovery rotation speed in the L/U OFF state is set at 1600 rpm. That is, the recovery rotation speed of the lockup state of the lockup clutch 2C is set to be lower than the recovery rotation speed of the unlock state of the lockup clutch 2C.

In addition, the fuel-cut operation does not start when a driver releases the accelerator pedal. That is, the fuel-cut operation does not start immediately when the accelerator opening changes to zero, but starts when a predetermined time period elapses after a driver releases the accelerator pedal. This is called a cut-in delay. During the cut-in delay, a torque down control of the internal combustion engine 1 is performed as a preliminary control.

If the fuel-cut operation starts as the accelerator opening changes to zero, an engine torque decrease amount (hereinafter, referred to as a torque gap) increases, and a shock caused by the torque gap makes a driver feel uncomfortable. In order to alleviate the torque gap, a torque down control is performed by reducing the output torque of the internal combustion engine 1 before the fuel-cut operation starts.

The torque down control is performed by retarding the fuel ignition timing. Specifically, the fuel ignition timing is gradually retarded during the cut-in delay to slowly lower the engine torque.

Figure 2:
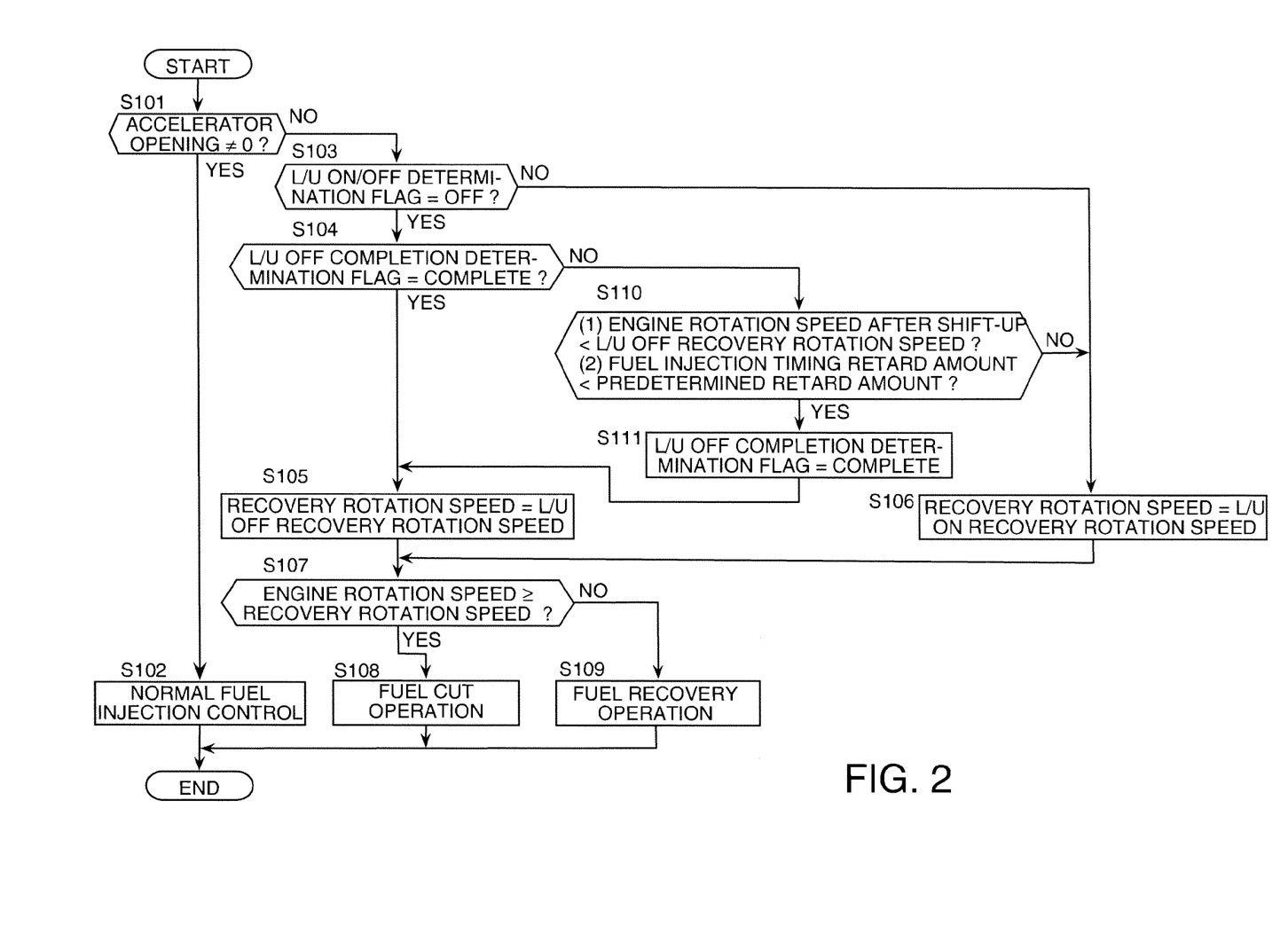
FIG. 2 is a flowchart illustrating a driving force control routine executed by an engine controller according to a first embodiment of this invention.

Referring to FIG. 2 next, a driving force control routine executed by the ECU 4 for the aforementioned control will be described. This routine is repeatedly executed by the ECU 4 at a certain time interval of, for example, 10 milliseconds, during a vehicle running. It should be noted that the retard control of the ignition timing of the internal combustion engine 1 is performed based on a separate routine executed simultaneously with this driving force control routine.

In a step S101, the ECU 4 determines whether or not the accelerator opening is equal to zero based on the input signal from the accelerator pedal depression sensor 6. When the driver depresses the accelerator pedal, the accelerator opening is not equal to zero. In this case, the ECU 4 executes the processing of a step S102. When the driver does not depress the accelerator pedal, the accelerator opening is equal to zero. In this case, the ECU 4 performs the processing of a step S103.

In the step S102, the ECU 4 performs a conventional fuel injection control of the internal combustion engine 1. Specifically, the opening of the intake throttle 1A is controlled depending on the accelerator opening, and the fuel injection control is performed based on the intake air amount at that time and a target air-fuel ratio. After the processing of step S102, the ECU 4 terminates the routine.

In the step S103, the ECU 4 determines whether or not an L/U ON/OFF determination flag is set to "OFF." The L/U ON/OFF determination flag is a flag indicating whether or not the unlock operation is instructed to the lockup clutch 2C.

In the step S103, when the L/U ON/OFF determination flag is set to "OFF," the ECU 4 performs the processing of a step S104. In the step S103, when the L/U ON/OFF determination flag is set to "ON," the ECU 4 performs the processing of a step S106.

The L/U ON/OFF determination flag is transmitted to the ECU 4 from the ATCU 5 via a CAN communication. The ATCU 5 selects whether the lockup clutch 2C of the torque converter 2B is locked or unlocked depending on a vehicle-driving condition such as an accelerator opening or a vehicle speed. Herein, the lockup state includes a perfect lockup state and a slip state as described above. When the lockup state is selected, the L/U ON/OFF determination flag is set to "ON" by the ATCU 5. When the unlock state is selected, the L/U ON/OFF determination flag is set to "OFF."

In the step S104, the ECU 4 determines whether or not the L/U OFF completion determination flag is set to "COMPLETE." If the determination is affirmative in the step S104, the ECU 4 performs the processing of a step S105. If the determination is negative in the step S104, the ECU 4 performs the processing of a step S110.

The L/U OFF completion determination flag is a flag set by the ECU 4. The L/U OFF completion determination flag is set to "COMPLETE" or "INCOMPLETE" depending on whether or not the lockup clutch 2C is perfectly unlocked. The L/U OFF completion determination flag is set to "COM- PLETE" when the lockup clutch is perfectly unlocked. The L/U OFF completion determination flag is set to "INCOMPLETE" when the lockup clutch 2C is not perfectly unlocked, that is, when the lockup clutch 2C is in a perfect lockup state or a slip state.

Specifically, if the L/U ON/OFF determination flag transmitted from the ATCU 5 is switched from "ON" to "OFF," the ECU 4 maintains the L/U OFF completion determination flag in "INCOMPLETE" until a predetermined time elapses from the switching. As a predetermined time elapses from the switching, the ECU 4 switches the L/U OFF completion determination flag to "COMPLETE."

Herein, the predetermined time is a time necessary until the perfect unlock state from the start of the unlock operation of the lockup clutch 2C. When the L/U ON/OFF determination flag does not switch, the L/U OFF completion determination flag is maintained in the "INCOMPLETE" state as long as the L/U ON/OFF determination flag is maintained in the "ON" state. The L/U OFF completion determination flag once switched to "COMPLETE" is maintained in the "COMPLETE" state as long as the L/U ON/OFF determination flag is set to "OFF."

In the step S105, the ECU 4 sets the recovery rotation speed to the L/U OFF recovery rotation speed and performs the processing of a step S107. In this embodiment, the L/U OFF recovery rotation speed is set at 1600 rpm.

In the step S106, the ECU 4 sets the recovery rotation speed to the L/U ON recovery rotation speed and performs the processing of the step S107. In this embodiment, the L/U ON recovery rotation speed is set at 800 rpm.

The recovery rotation speed is an engine rotation speed serving as a reference of the fuel-cut and fuel recovery operations. The fuel recovery operation means resumption of fuel supply from a fuel supply prevention state caused by the fuel-cut operation. The ECU 4 performs the fuel-cut operation when the engine rotation speed is higher than the recovery rotation speed while the accelerator opening is equal to zero. In addition, the ECU 4 performs the fuel recovery operation when the engine rotation speed is lower than the recovery rotation speed during the fuel-cut operation. The processing of the step S105 means that the recovery rotation speed is set at the L/U OFF recovery rotation speed of 1600 rpm if the lockup clutch 2C is perfectly unlocked. The processing of the step S106 means that the recovery rotation speed is set at the L/U ON recovery rotation speed of 800 rpm in the other circumstance, i.e., when the lockup clutch 2C is locked up, or in the course of the unlock/lock operations.

In the step S107, the ECU 4 determines whether or not the engine rotation speed is equal to or higher than the recovery rotation speed. If the engine rotation speed is equal to or higher than the recovery rotation speed, the ECU 4 performs the processing of a step S108. If the engine rotation speed is lower than the recovery rotation speed, the ECU 4 performs the processing of a step S109.

In the step S108, the ECU 4 performs the fuel-cut operation to stop the engine fuel injection. After the processing of the step S108, the ECU 4 terminates the routine.

In the step S109, the ECU 4 performs the fuel recovery operation to resume the engine fuel injection. After the processing of the step S109, the ECU 4 terminates the routine.

Meanwhile, in the step S110 executed when the determination of the step S104 is negative, the ECU 4 performs the following prediction. Specifically, the ECU 4 predicts whether or not the fuel recovery operation will be performed if the fuel-cut operation and the lockup clutch unlock operation are simultaneously performed.

The prediction is performed by determining the following conditions (1) and (2). If both the conditions (1) and (2) are satisfied, the ECU 4 predicts that the fuel recovery operation will be performed. If one or both of the conditions (1) and (2) is not satisfied, the ECU 4 predicts that the fuel recovery operation will not be performed.

(1) The engine rotation speed is lower than the L/U OFF recovery rotation speed.
(2) The ignition timing retard amount is smaller than a predetermined value.

The predetermined value is set to a torque down limit such that the driver does not feel a shock even when the torque down control stops.

If both the conditions (1) and (2) are satisfied, the ECU 4 predicts that the fuel recovery operation will be performed. In this case, the ECU 4 performs the processing of a step S111. Otherwise, if any one or both of the conditions (1) and (2) is not satisfied, the ECU 4 predicts that the fuel recovery operation will not be performed. In this case, the ECU 4 performs the processing of the step S106.

In the step S111, the ECU 4 changes the L/U OFF completion determination flag from "INCOMPLETE" to "COMPLETE." After the processing of the step S111, the ECU 4 performs processing of the step S105.

In the step S105, the recovery rotation speed is set at 1600 rpm and thereafter the rotation speed of the internal combustion engine 1 having an accelerator opening of zero becomes lower than the recovery rotation speed.

By setting the recovery rotation speed in this manner, the determination of the step S107 becomes negative and the fuel-cut operation is substantially prohibited. Since the L/U OFF completion determination flag is set to "COMPLETE" in the subsequent routine execution, the determination of the step S104 is affirmative. Therefore, in the step S105, the recovery rotation speed is maintained in the L/U OFF recovery rotation speed, and the determination of the step S107 continues to be negative. As a result, in the step S109, the fuel recovery operation is performed, and the fuel-cut operation is continuously substantially prohibited.

Meanwhile, if any one or both of the conditions (1) and (2) are not satisfied, the ECU 4 predicts that the fuel recovery operation is not performed and performs the processing of the step S106. In the step S106, the ECU 4 sets the recovery rotation speed at the L/U ON recovery rotation speed of 800 rpm. In this case, the engine rotation speed may be higher than the recovery rotation speed even when the accelerator opening is equal to zero. In that event, the determination of the step S107 is affirmative and the fuel-cut operation is executed in the step S108.

Through the processing of the steps S104 to S106, S110, and S111, the ECU 4 predicts whether or not the fuel recovery operation will be performed as the engine rotation speed decreases by simultaneously performing the fuel-cut operation and the unlock operation of the lockup clutch 2C. It is possible to improve prediction accuracy by performing this prediction on the basis of the engine rotation speed and the ignition timing delay.

The ECU 4 forcedly sets the L/U OFF completion determination flag to "COMPLETE" in the step S111 in order to set the determination of the step S104 to be affirmative at all times in the subsequent routine execution. As long as the determination in the step S104 is affirmative, the recovery rotation speed is maintained at the L/U OFF recovery rotation speed of 1600 rpm in the step S105.

A typical fuel-cut algorithm is performed in the steps S107 to S109.

Specifically, in the step S107, the ECU 4 determines whether or not the engine rotation speed is equal to or higher than the recovery rotation speed. If the determination is affirmative, the fuel-cut operation is executed in the step S108. If the determination is negative, the fuel recovery operation is performed in the step S109. In other words, the fuel-cut operation is prohibited by performing a fuel injection corresponding to the accelerator opening of zero.

As described above, as the ECU 4 sets the recovery rotation speed to the L/U OFF recovery rotation speed in the step S105, the fuel-cut operation is substantially prohibited because, typically, the engine rotation speed is not higher than 1600 rpm while the accelerator opening is equal to zero.

In this manner, by increasing the recovery rotation speed from the L/U ON recovery rotation speed to the L/U OFF recovery rotation speed when both the conditions (1) and (2) are satisfied, it is possible to easily prohibit the fuel-cut operation without directly controlling the output signal to the fuel injector 1B. It should be noted that the L/U OFF completion determination flag is switched from "INCOMPLETE" to "COMPLETE" in the step S111 before the recovery rotation speed is set to the L/U OFF recovery rotation speed in the step S105. For this reason, in the subsequent routine execution, the determination of the step S104 changes to be affirmative.

The recovery rotation speed is maintained in the L/U OFF recovery rotation speed until the accelerator pedal is depressed again, and the accelerator pedal is then released. In this circumstance, the determination in both the steps S101 and the S103 changes to be negative and the recovery rotation speed is set to the L/U ON recovery rotation speed in the step S106.

Referring to FIGS. 3A to 3I and 4A to 4I next, a result of executing the driving force control routine of FIG. 2 will be described. FIGS. 3A to 3I illustrate a result of the driving force control routine of FIG. 2. FIGS. 4A to 4I illustrate a comparative example.

In the comparative example, steps S110 and S111 of the driving force control routine of FIG. 2 are omitted. In addition, when the determination of the step S104 is negative, the recovery rotation speed is set at the L/U ON recovery rotation speed of 800 rpm at all times in the step S106. In this comparative example, compared to the driving force control routine of FIG. 2, a process of determining whether or not the fuel recovery operation is executed when the fuel-cut operation and the unlock operation of the lockup clutch 2C are performed and a process of prohibiting the fuel-cut operation based on this determination are omitted.

Referring first to FIGS. 4A to 4I, the comparative example will be described.

Herein, as the accelerator pedal is released during a vehicle running, the unlock operation of the lockup clutch 2C from the lockup state is executed. A description will now be made on how to perform the fuel recovery operation and the fuel-cut operation of the engine 1 in this case.

Before a timing t0, the driver depresses the accelerator pedal, and the vehicle runs in an acceleration state. At this time, the lockup clutch is controlled to a slip state. That is, the engine rotation speed is higher than the turbine rotation speed in order to increase an accelerating force using a torque boost capability of the torque converter.

Figure 4A:
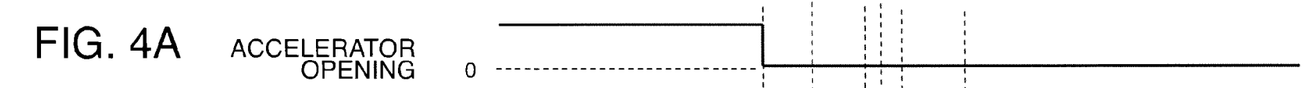
FIGS. 4A to 4H are timing charts illustrating a driving force control result in a comparison example in which a part of steps of the driving force control routine are omitted.

As a driver releases the accelerator pedal at the timing t0, the accelerator opening becomes zero as illustrated in FIG. 4A.

Figures 4B, 4C:
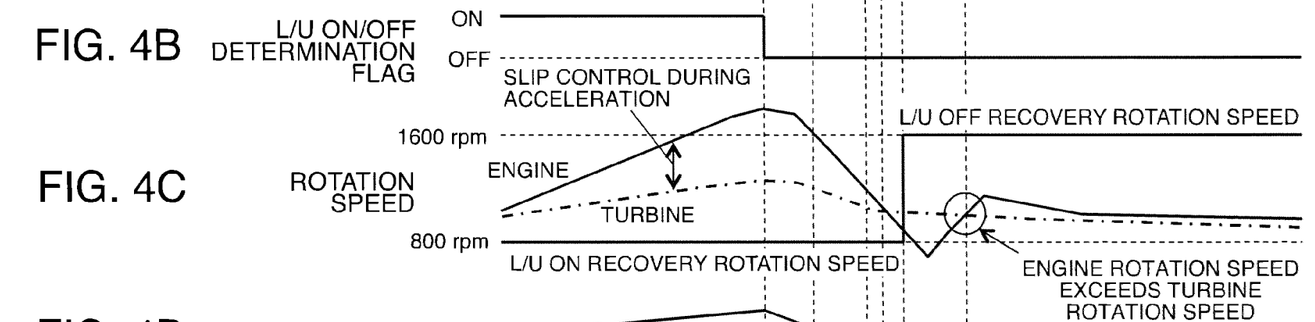

As the accelerator opening becomes zero, the ATCU 5 changes the L/U ON/OFF determination flag from "ON" to "OFF" as illustrated in FIG. 4B. The ATCU 5 starts the unlock operation for changing the lockup clutch 2C from the lockup state to the perfect unlock state.

Figure 4D:
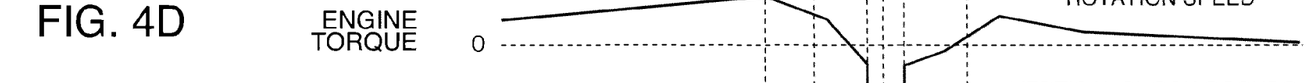

Meanwhile, the ECU 4 starts the fuel-cut operation described below as the accelerator pedal is released at the timing t0. Specifically, at the timing t0, the lockup clutch 2C is not perfectly unlocked immediately after the unlock operation starts. Therefore, the ECU 4 maintains the L/U OFF completion determination flag in "INCOMPLETE" as illustrated in FIG. 4I. Since the L/U OFF completion determination flag is set to "INCOMPLETE," the ECU 4 selects the L/U ON recovery rotation speed of 800 rpm as the recovery rotation speed as illustrated in FIG. 4D. In this case, since the engine rotation speed is higher than the L/U ON recovery rotation speed, the fuel-cut operation is performed after the timing t0 in FIG. 4F.

Figure 4E:
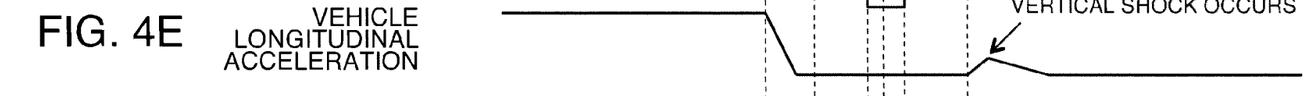
Figure 4F:
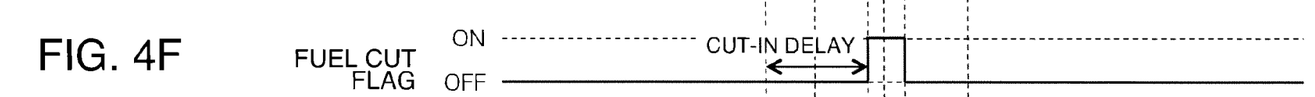

The fuel-cut operation comprises a torque down control performed by retarding the fuel ignition timing during a time period between the timing t0 and a timing t2 and a fuel-cut operation performed after the timing t2.

Figure 4G:
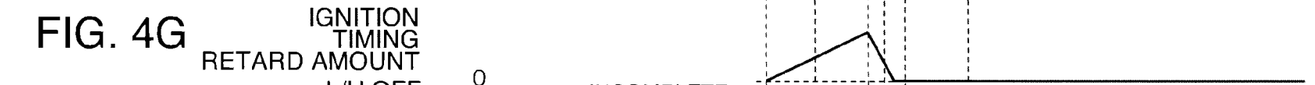

For retarding the fuel ignition timing, as illustrated in FIG. 4G, the engine torque gradually decreases by gradually increasing the retard amount during the time period between the timings t0 and t2. The fuel ignition timing is delayed by executing a routine separate from the driving force control routine of FIG. 2 using the ECU 4.

In the fuel-cut operation, the fuel injection of the internal combustion engine 1 stops after the timing t2. As a result, the engine torque decreases stepwise. However, since the torque down control is performed in advance, the torque gap is insignificant, and the driver does not feel uncomfortable.

Through the unlock operation of the lockup clutch 2C and the fuel-cut operation described above, the engine rotation speed and the turbine rotation speed gradually decrease during a time period from the timing t0 and a timing t3 as illustrated in FIG. 4C.

Figure 4H:
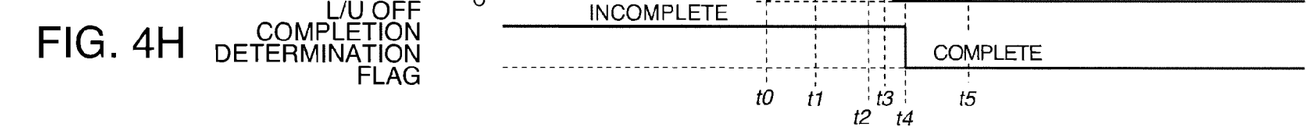

After the timing t3, the turbine rotation speed stays at a vehicle speed equivalent value. However, the engine rotation speed further decreases. This is called a free fall descent. At the timing t3, the unlock operation of the lockup clutch 2C advances to nearly the perfect unlock state as illustrated in FIG. 4H. The free fall descent of the engine rotation speed is generated by continuously performing the fuel-cut operation under such a condition.

At a timing t4 when a predetermined time elapses after the timing t0, the ECU 4 switches the L/U OFF completion determination flag from "INCOMPLETE" to "COMPLETE" as illustrated in FIG. 4H. Herein, the predetermined time is set in advance as a time necessary to obtain the perfect unlock state after the start of the unlock operation of the lockup clutch 2C. The ECU 4 determines that the lockup clutch 2C is perfectly unlocked at the timing t4 when the predetermined time elapses from the timing t0.

As the L/U OFF completion determination flag is switched from "INCOMPLETE" to "COMPLETE" at the timing t4, the recovery rotation speed is switched from the L/U ON recovery rotation speed of 800 rpm to the L/U OFF recovery rotation speed of 1600 rpm as illustrated in FIG. 4C.

As a result, the engine rotation speed is lower than the L/U OFF recovery rotation speed. Therefore, as illustrated in FIG. 4F, the fuel-cut flag is switched from "ON" to "OFF," and the fuel recovery operation is executed. Here, the fuel-cut flag is a flag used to distinguish between execution of the fuel-cut operation and non-execution of the fuel-cut operation. If the fuel-cut flag is set to "ON," that means the fuel-cut operation is executed. If the fuel-cut flag is set to "OFF," that means the fuel-cut operation is not executed.

As the fuel injection of the internal combustion engine 1 is resumed by the fuel recovery operation after the timing D, the engine torque increases as illustrated in FIG. 4D. Accordingly, the engine rotation speed is changed from a free fall state to a rising state as illustrated in FIG. 4C. The rise of the engine rotation speed is terminated when the engine rotation speed exceeds the turbine rotation speed. Then, the engine rotation speed is stabilized at a substantially equal level to the turbine rotation speed. In this manner, it is possible to avoid an engine stall by the fuel recovery operation after the timing t4.

In this comparative example, as an accelerator pedal is released during a vehicle running, the unlock operation of the lockup clutch 2C and the fuel-cut operation of the internal combustion engine 1 are simultaneously performed. Then, the fuel recovery operation is executed. For this reason, the following problems may occur.

Specifically, the engine rotation speed varies from a rotation speed lower than the turbine rotation speed to a rotation speed higher than the turbine rotation speed at a timing t5 as illustrated in FIG. 4C. Accordingly, a speed ratio of the torque converter 2B, that is, the turbine rotation speed divided by the engine rotation speed is changed from a region equal to or higher than unity to a region lower than unity. As a result, a torque capacity coefficient of the torque converter 2B abruptly increases, and a transmission torque increases. The increase of the transmission torque generates a vertical shock in a vehicle longitudinal acceleration as illustrated in FIG. 4E and makes a driver feel uncomfortable.

Meanwhile, by executing the driving force control routine of FIG. 2, it is possible to prevent a vertical shock generated in the comparative example of FIGS. 4A to 4H.

Referring to FIGS. 3A to 3H, a result of executing this driving force control routine will be described.

The embodiment of FIGS. 3A to 3H is different from the comparative example of FIGS. 4A to 4H generally in the timing of changing the L/U OFF completion determination flag from "INCOMPLETE" to "COMPLETE."

Figure 3A:
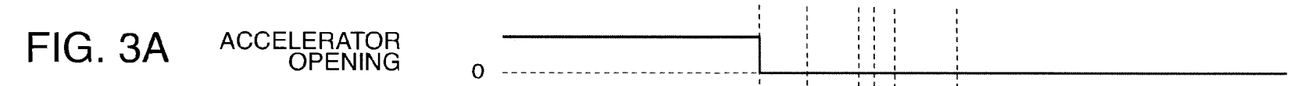
FIGS. 3A to 3H are timing charts illustrating a driving force control result obtained by executing the driving force control routine.

As the driver releases the accelerator pedal at a timing t0 during a vehicle running, the accelerator opening becomes zero as illustrated in FIG. 3A.

Figures 3B, 3C:
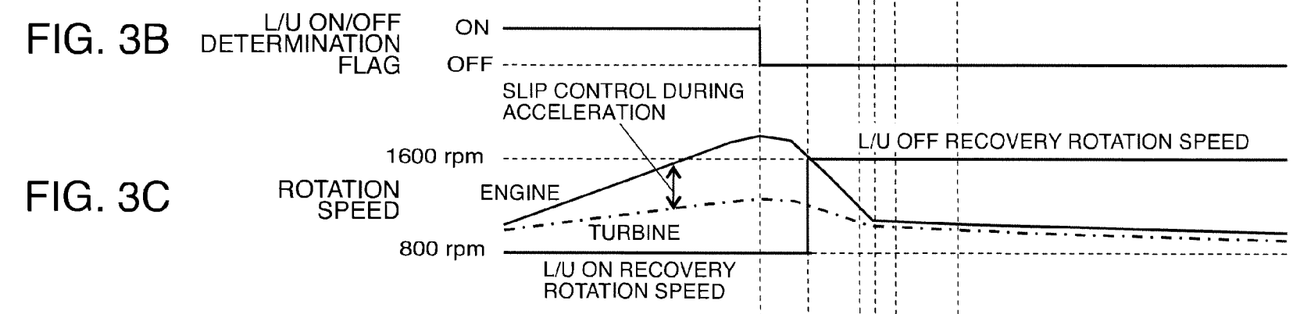

The ATCU 5 changes the L/U ON/OFF determination flag from "ON" to "OFF" at the timing t0 as illustrated in FIG. 3B to start an unlock operation for changing the lockup clutch 2C from the lockup state to the perfect unlock state.

Meanwhile, the ECU 4 predicts whether or not the fuel recovery operation will be executed after the unlock operation of the lockup clutch 2C and the fuel-cut operation of the internal combustion engine 1 are simultaneously performed in the step S110. This prediction is performed whenever the routine is executed.

At a timing t1, if the engine rotation speed is lower than the recovery rotation speed, the determination of the step S110 is changed to be affirmative and it is predicted that the fuel recovery operation will be executed. Based on this prediction, the ECU 4 immediately prohibits the torque down operation and the fuel-cut operation performed by cutting off a fuel. At the timing t1, the aforementioned cut-in delay is in the progress, and the torque down control is performed by retarding the ignition timing before the fuel-cut operation.

In the step S110, in addition to the engine rotation speed, whether or not the ignition timing retard amount is smaller than a predetermined value is applied to predict the fuel recovery operation. If the torque down amount caused by the torque down operation is high, the torque abruptly increases due to the fuel recovery operation. Therefore, a high torque gap is generated, and the driver may feel uncomfortable. In order to prevent such an uncomfortable feeling, the determination of the step S110 becomes negative if the ignition timing retard amount is equal to or higher than a predetermined value.

Figure 3D:
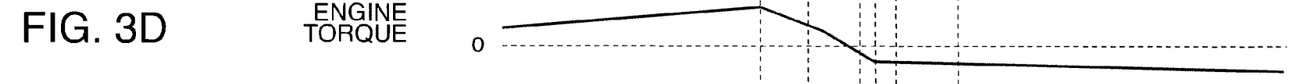
Figure 3E:
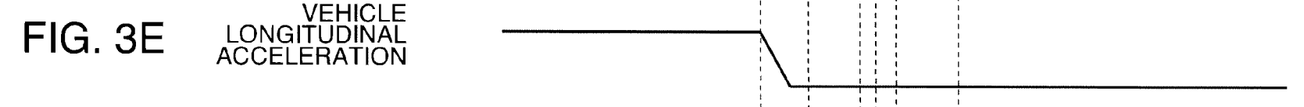
Figures 3F, 3G:
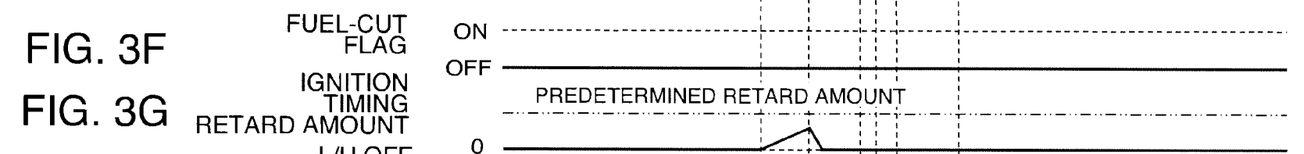

Accordingly, the determination of the step S110 changes to be affirmative at the timing t1 only when the engine rotation speed is lower than the recovery rotation speed as illustrated in FIG. 3C, and the ignition timing retard amount is smaller than a predetermined value as illustrated in FIG. 3G. In this case, a larger torque gap does not occur enough to make the driver feel uncomfortable even when the fuel recovery operation is performed.

Figure 3H:
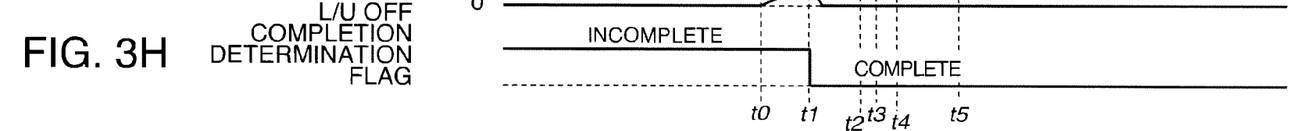

However, if the determination of the step S110 changes to be affirmative, the L/U OFF completion determination flag is switched to "COMPLETE" in the step S111 as illustrated in FIG. 3H. As a result, in the step S105, the recovery rotation speed is set to the L/U OFF recovery rotation speed of 1600 rpm as illustrated in FIG. 3C. This means that the fuel-cut operation is substantially prohibited because, typically, the engine rotation speed is not higher than 1600 rpm while the accelerator opening is equal to zero.

If the L/U OFF completion determination flag is switched to "COMPLETE," the determination of the step S104 changes to be affirmative in the subsequent routine execution. Therefore, the recovery rotation speed is subsequently maintained at the L/U OFF recovery rotation speed of 1600 rpm until the lockup clutch 2C is locked again. As a result, after the timing t1, the fuel-cut operation is prohibited, and the fuel recovery operation is performed.

The engine rotation speed decreases as the accelerator pedal is released. In addition, the engine rotation speed further decreases to the turbine rotation speed corresponding to the vehicle speed at a timing t3 under the fuel recovery operation and is then maintained in the turbine rotation speed as illustrated in FIG. 3C.

That is, a torque gap caused by performing the fuel recovery operation from the fuel-cut operation and a resulting vertical shock generated in the vertical longitudinal acceleration as illustrated in FIGS. 4A to 4H do not occur under this driving force control routine.

In this driving force control routine, it is predicted that the fuel recovery operation will be performed when both the conditions are satisfied, including a condition that the fuel ignition timing retard amount is smaller than a predetermined value and a condition that the engine rotation speed is lower than the L/U OFF recovery rotation speed. Therefore, it is not necessary to add a complicated prediction method in order to predict whether or not the fuel recovery operation will be performed. That is, it is possible to easily design a control system provided with such a driving force control routine.

In this driving force control routine, the prohibition of the fuel-cut operation is implemented just by changing the L/U OFF completion determination flag from "INCOMPLETE" to "COMPLETE." Therefore, it is not necessary to add a new prohibition control, and it is possible to prevent a shock generated by the fuel recovery operation during a vehicle coasting without sophisticating the driving force control routine.

In the embodiment described above, the accelerator pedal depression sensor 6 serves as means for detecting an accelerator pedal release, and the engine rotation speed sensor 8 serves as means for detecting an engine rotation speed. In addition, the ATCU 5 servers as means for unlocking the lockup clutch, and the ECU 4 serves as means for performing the fuel-cut operation, means for performing the fuel recovery operation, means for predicting the fuel recovery operation, and means for prohibiting the fuel-cut operation.

Referring to FIGS. 5, 6A to 6I, and 7A to 7I next, a second embodiment of this invention will be described.

Similar to the first embodiment, the vehicle-driving device according to the second embodiment has the hardware configuration illustrated in FIG. 1. This embodiment is different from the first embodiment in that the ECU 4 executes a driving force control routine of FIG. 5 instead of the driving force control routine of FIG. 2.

Figure 5:
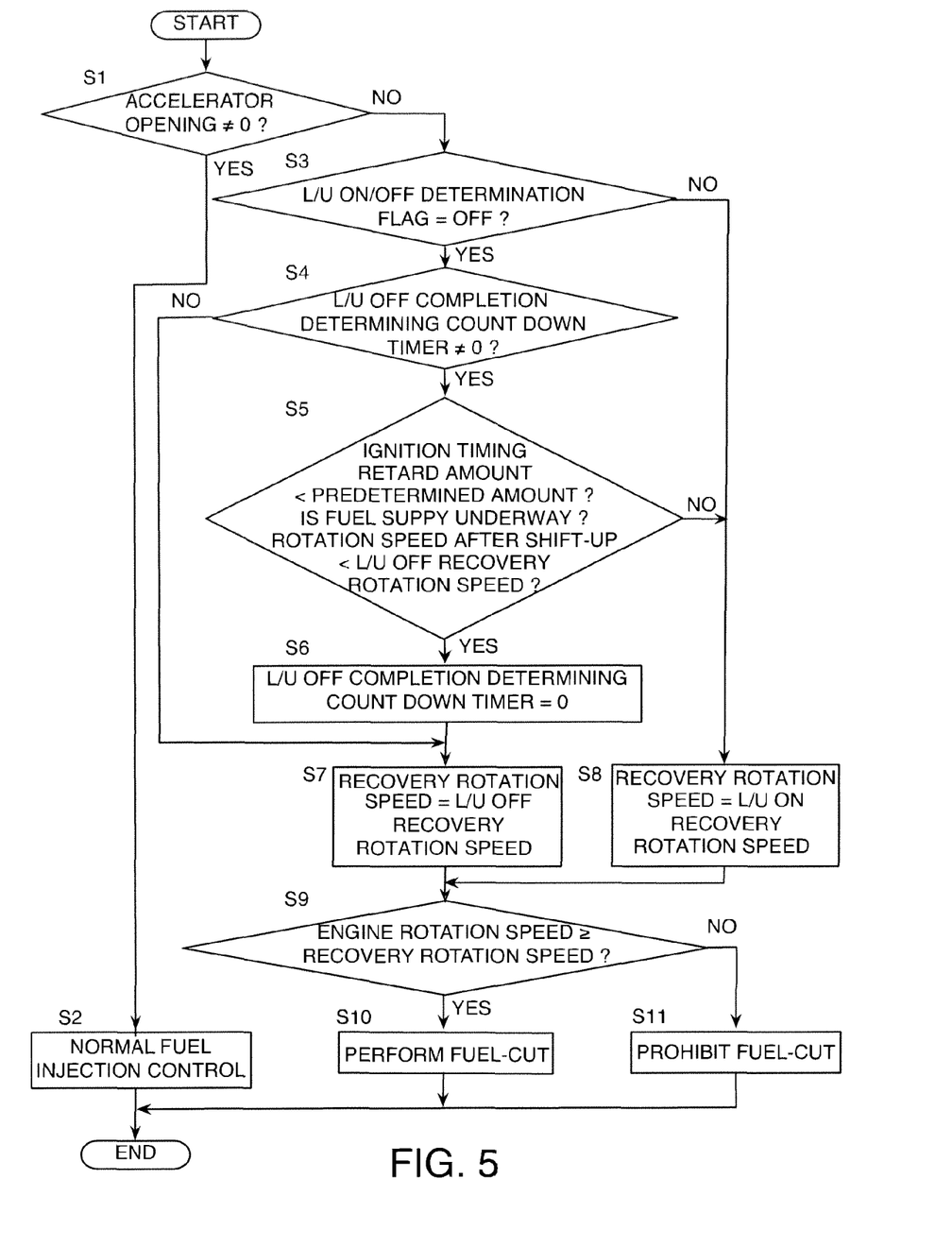
FIG. 5 is a flowchart illustrating a driving force control routine executed by an engine controller according to a second embodiment of this invention.

Referring to FIG. 5, the driving force control routine according to the second embodiment will be described. This routine is also repeatedly executed by the ECU 4 during a vehicle running at a constant time interval of, for example, 10 milliseconds.

In a step S1, the ECU 4 determines whether or not the accelerator opening is equal to zero based on an input signal from the accelerator pedal depression sensor 6. If it is determined that the accelerator opening is not equal to zero, a typical fuel injection control is performed depending on the accelerator opening in a step S2. Thereafter, the routine is terminated.

If it is determined that the accelerator opening is equal to zero in the step S1, the ECU 4 performs the following determination in a step S3.

In the step S3, the ECU 4 determines whether or not the L/U ON determination flag is set to "OFF." The L/U ON/OFF determination flag is a flag indicating whether or not the unlock operation of the lockup clutch 2C is instructed. It should be noted that as soon as the accelerator opening becomes equal to zero, a separate routine is invoked to perform retardation of the ignition timing of the internal combustion engine 1.

In the step S3, if the L/U ON/OFF determination flag is not set to "OFF," that means the lockup clutch 2C is in a lockup state or a slip state. In this case, the ECU 4 sets the recovery rotation speed at the L/U ON recovery rotation speed in a step S8 and then performs the processing of a step S9. If the L/U ON/OFF determination flag is set to "OFF" in the step S3, the ECU 4 performs the processing of a step S4 and subsequent steps.

In the step S4, the ECU 4 determines whether or not the L/U OFF completion determining countdown timer is set to a non-zero value. A certain time interval is necessary until the lockup clutch 2C is completely unlocked after there is an instruction for unlocking the lockup clutch 2C in a lockup state. The L/U OFF completion determining countdown timer detects that a certain time interval elapses after the L/U ON/OFF determination flag is changed to "OFF" by performing a countdown. The ECU 4 determines that the lockup clutch 2C is completely unlocked when the value of the L/U OFF completion determining countdown timer becomes zero. If the value of the L/U OFF completion determining countdown timer is not equal to zero, the ECU 4 determines that the lockup clutch 2C is in the course of the unlock operation.

In the step S4, if the L/U OFF completion determining countdown timer is equal to a non-zero value, the ECU 4 performs the processing of a step S5. If the L/U OFF completion determining countdown timer is equal to zero, the ECU 4 performs the processing of a step S7 and subsequent steps.

In the step S5, the ECU 4 determines whether or not all of the following conditions a) to c) are satisfied.

a) Is the ignition timing retard amount smaller than a predetermined value?
b) Is fuel supply underway?
c) Is the engine rotation speed lower than the L/U OFF recovery rotation speed?

The condition a) is to determine whether or not the torque down control based on the fuel-cut operation is under execution in the internal combustion engine 1. In the torque down control, the ignition timing retard amount increases toward the fuel-cut timing as described above. If the ignition timing retard amount is smaller than the predetermined value, it means that the retardation control of the ignition timing is in a relatively initial stage.

On the contrary, if the fuel-cut operation is suppressed in a timing where the ignition timing retardation control has performed right up to the fuel-cut operation, a torque shock may occur more significantly due to the interruption of the torque down control than in a case where the fuel-cut operation is executed. Therefore, if the ignition timing retard amount is equal to or larger than the predetermined value, it is preferable that the fuel-cut operation not be suppressed. Meanwhile, if the ignition timing retard amount is smaller than the predetermined value, it can be determined that a torque shock caused by suppressing the fuel-cut operation is negligible.

If the retardation of the ignition timing is performed with a constant retard amount, or in other words, if only the retardation ON/OFF control is performed, it is determined whether or not the retardation has substantially started in the determination of the item a). In this case, after the retardation starts, it can be determined that the condition a) is not satisfied.

The condition b) is set in order not to suppress the fuel-cut operation if the internal combustion engine 1 is already in the fuel-cut operation.

The condition c) is to determine whether or not the recovery after the fuel-cut operation generates a shock. If the fuel-cut operation is executed while the engine rotation speed is lower than the L/U OFF recovery rotation speed, a shock is generated by the subsequent fuel recovery operation.

If all of the conditions a) to c) are satisfied in the step S5, the ECU 4 predicts that the fuel recovery operation will be performed as the fuel-cut operation and the unlock operation of the lockup clutch 2C are performed. In this case, the ECU 4 resets the L/U OFF completion determining countdown timer to zero in a step S6.

The ECU 4 sets the recovery rotation speed to the L/U OFF recovery rotation speed in the next step S7. By increasing the recovery rotation speed to the L/U OFF recovery rotation speed, execution of the fuel-cut operation is significantly restricted. After the processing of the step S7, the ECU 4 performs the processing of the step S9 and the subsequent steps.

Meanwhile, if at least one of the conditions a) to c) is not satisfied in the step S5, the ECU 4 sets the recovery rotation speed to the L/U ON recovery rotation speed in the step S8 and performs the processing of the step S9 and the subsequent steps.

In steps S9 to S11, the fuel-cut operation and non-operation are selectively executed.

In the step S9, the ECU 4 determines whether or not the engine rotation speed is equal to or higher than the recovery rotation speed. If the determination is affirmative, the fuel-cut operation is executed in the step S10. If the determination is negative, fuel injection is executed for the case where the accelerator opening is equal to zero in the step S11. The processing of the step S11 means the fuel recovery operation when the fuel-cut operation is under execution. The processing of the step S11 means prohibition of the fuel-cut operation when the fuel-cut operation is not under execution. The ignition timing applied in the step S11 is set to typical ignition timing. That is, in the step S11, the ignition timing retardation control is also released. After the processing of the step S10 or S11, the ECU 4 terminates the routine.

Herein, the recovery rotation speed used in the determination of the step S9 is set to the L/U OFF recovery rotation speed when the process is subjected to the step S7. If the process is not subjected to the step S7, the recovery rotation speed of the step S9 is set to the L/U ON recovery rotation speed. The process is subjected to the step S7 only when all of the conditions a) to c) are satisfied in the step S5 at least once after the determination of the step S4 is affirmative.

If the recovery rotation speed is set to the L/U OFF recovery rotation speed of 1600 rpm, the fuel-cut operation is not performed as long as the engine rotation speed is not equal to or higher than approximately 1600 rpm. That is, the fuel-cut operation is executed only when the internal combustion engine is rotated in a high speed.

In this manner, if all of the conditions a) to c) are satisfied while the accelerator opening is equal to zero, the recovery rotation speed is increased to the L/U OFF recovery rotation speed. As a result, it is possible to easily suppress the fuel-cut operation and perform the fuel recovery operation without directly controlling the output signal of the fuel injector 1B.

It should be noted that the determination of the step S5 is made only when the accelerator opening is equal to zero in the step S1, and the L/U OFF completion determining countdown timer is not equal to zero in the step S4. If suppression of the fuel-cut operation is restricted to such a condition, the following effects can be obtained. Specifically, it is possible to prevent a shock caused by the fuel recovery operation after the fuel-cut operation performed when the accelerator pedal is released while suppressing an increase of the fuel consumption by not excessively suppressing the fuel-cut operation.

Referring to FIGS. 6A to 6I and FIGS. 7A to 7I, a result of the driving force control routine of FIG. 5 according to the second embodiment will be described. FIGS. 6A to 6I illustrate a result of the driving force control routine of FIG. 5. FIGS. 7A to 7I illustrate a comparative example.

In the comparative example, the steps S5 and S6 are omitted from the driving force control routine of FIG. 5. In addition, if the determination in the step S4 is negative, the recovery rotation speed is always set to the L/U ON recovery rotation speed of 800 rpm. This corresponds to a case where a process of predicting the fuel recovery operation when the fuel-cut operation and the unlock operation of the lockup clutch 2C are performed and a process of suppressing the fuel-cut operation based on this prediction are omitted from the driving force control routine of FIG. 5.

Referring to FIGS. 7A to 7I first, a comparative example will be described.

Similarly, in the comparative example, the recovery rotation speed is switched between the L/U ON recovery rotation speed and the L/U OFF recovery rotation speed. In other words, the ECU 4 applies the L/U OFF recovery rotation speed when the unlocking of the lockup clutch 2C is completed. Otherwise, the ECU 4 applies the L/U ON recovery rotation speed to perform the fuel-cut operation and the fuel recovery operation. However, switching of the recovery rotation speed based on the determination of the conditions a) to c) is not performed.

The ECU 4 determines whether or not the unlocking of the lockup clutch 2C is completed based on the L/U OFF completion determining countdown timer. That is, the ECU 4 operates the L/U OFF completion determining countdown timer as illustrated in FIG. 7D in response to the L/U ON/OFF determination flag synchronized with an instruction of unlocking the lockup clutch 2C. The ECU 4 determines that the unlocking of the lockup clutch 2C is completed as the L/U OFF completion determining countdown timer becomes equal to zero.

Figures 7A, 7B:
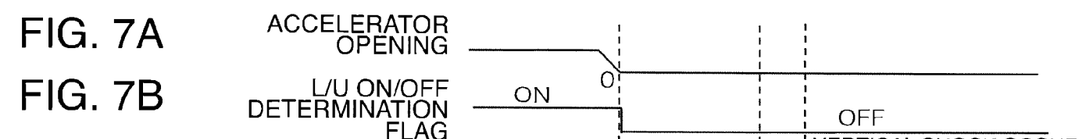
FIGS. 7A to 7I are timing charts illustrating a driving force control result in a comparison example in which a part of steps of the driving force control routine of FIG. 5 are omitted.
Figures 7C, 7D:
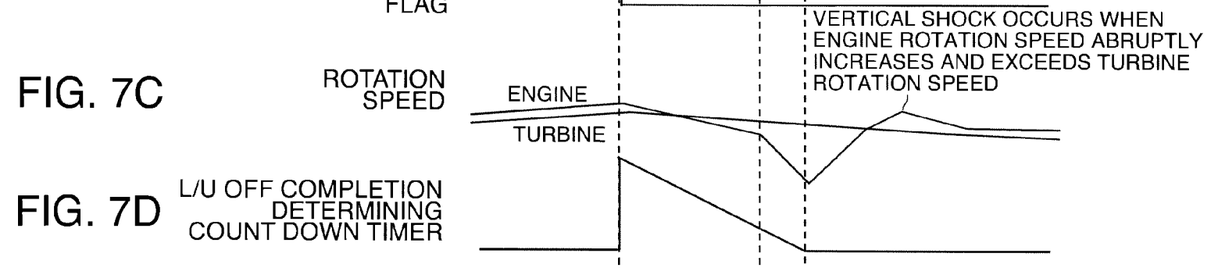
Figure 7E:
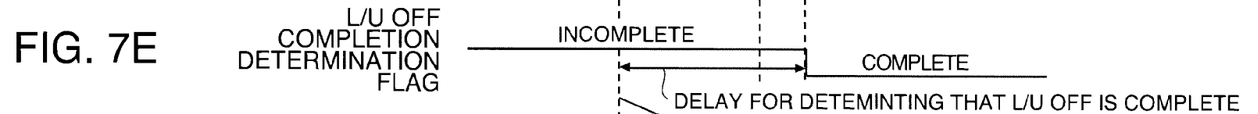
Figures 7F, 7G, 7H, 7I:
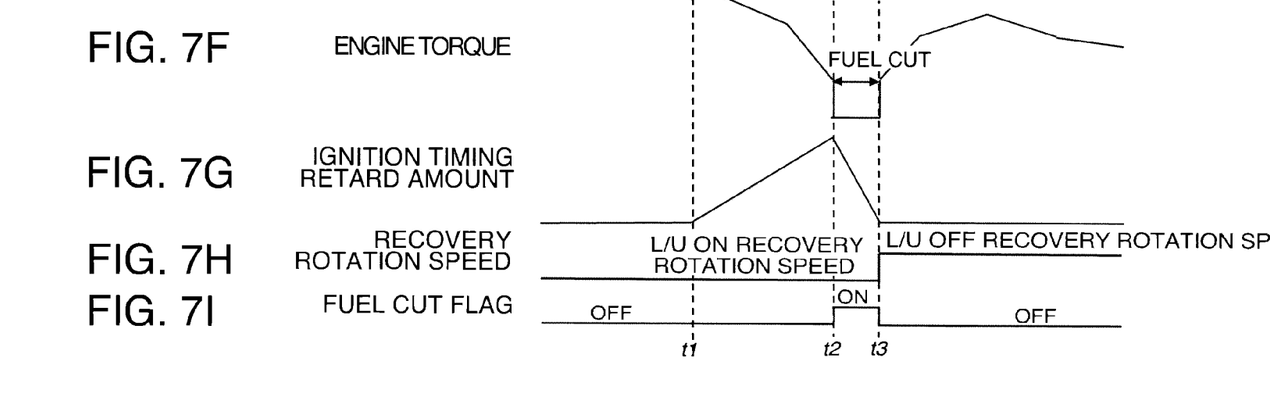

As the accelerator opening is equal to zero at a timing t1 as illustrated in FIG. 7A, and the instruction for unlocking the lockup clutch 2C is generated, the L/U ON/OFF determination flag is set to "OFF" as illustrated in FIG. 7B. Since the accelerator opening is equal to zero, the retardation of the ignition timing of the internal combustion engine 1 starts at the timing t1 if the engine rotation speed is higher than the lockup ON recovery rotation speed of 800 rpm. At a timing t2 when the retard amount reaches a predetermined value, the fuel-cut flag is set to "ON" as illustrated in FIG. 7I, and the fuel-cut operation is executed. As a result, as illustrated in FIG. 7F, the engine torque significantly decreases.

At a timing t3, as illustrated in FIG. 3D, the L/U OFF completion determining countdown timer becomes equal to zero. At the same time, the L/U OFF completion determination flag of FIG. 7E is switched from "INCOMPLETE" to "COMPLETE." Accordingly, as illustrated in FIG. 3H, the recovery rotation speed is switched to the L/U OFF recovery rotation speed of 1600 rpm.

As a result, the fuel-cut flag is reset to "OFF," and the fuel recovery operation is immediately executed. At the same time, the retardation of the ignition timing is also reset. By such a processing, the engine torque that has been temporarily lowered by the fuel-cut operation rapidly increases at the timing t3 as illustrated in FIG. 7F.

Accordingly, as illustrated in FIG. 7C, the engine rotation speed increases over the turbine rotation speed, or in other words a rapid rotation increase of the internal combustion engine 1 occurs. This engine torque fluctuation generates a torque shock in a vehicle via the torque converter 2B.

Meanwhile, by executing the driving force control routine of FIG. 5 according to this embodiment, it is possible to prevent a torque shock generated in the comparative example of FIGS. 7A to 7I.

FIGS. 6A to 6I illustrate a result of the driving force control when the driving force control routine of FIG. 5 is executed.

Figure 6A:
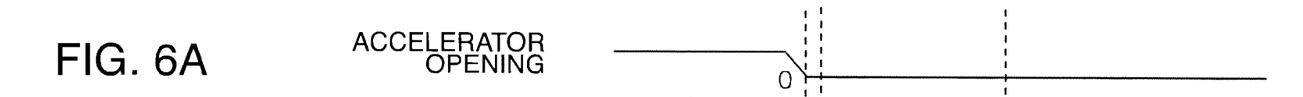
FIGS. 6A to 6I are timing charts illustrating a driving force control result obtained by executing the driving force control routine of FIG. 5.
Figure 6B:
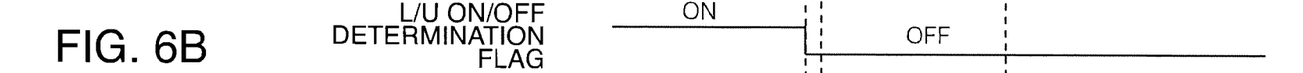
Figure 6C:
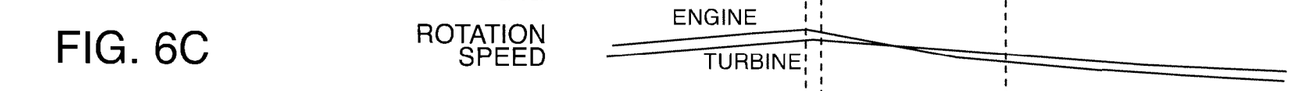

Here, as illustrated in FIG. 6A, as the accelerator pedal is released, and the accelerator opening is equal to zero at a timing t1, the unlocking of the lockup clutch 2C is instructed as illustrated in FIG. 6B. At the same time, as illustrated in FIG. 6G, the ECU 4 starts retardation of the ignition timing of the fuel injector 1B. In this state, the fuel-cut operation is not executed. Therefore, if the engine rotation speed of the internal combustion engine 1 is lower than the L/U OFF recovery rotation speed of 1600 rpm, the determination in the step S5 is negative in the driving force control routine of FIG. 5.

Figure 6D:
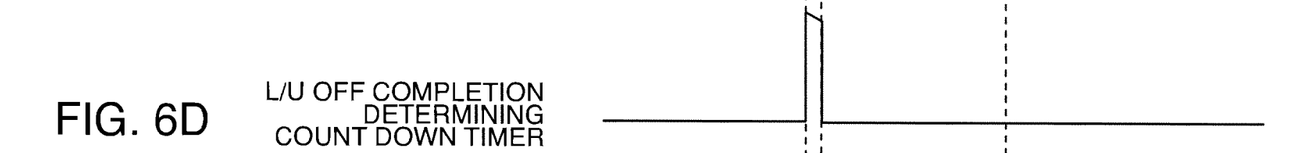
Figure 6E:
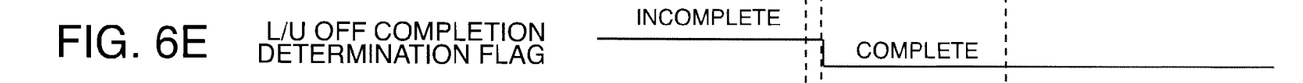
Figure 6F:
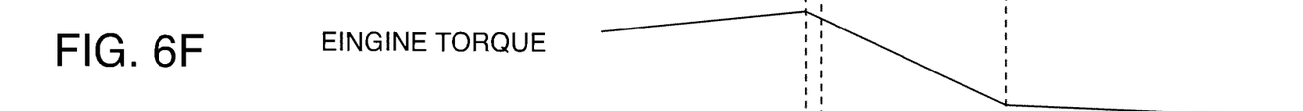
Figure 6G:
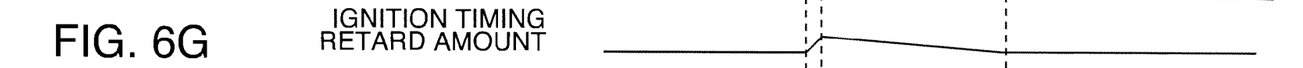
Figure 6H:
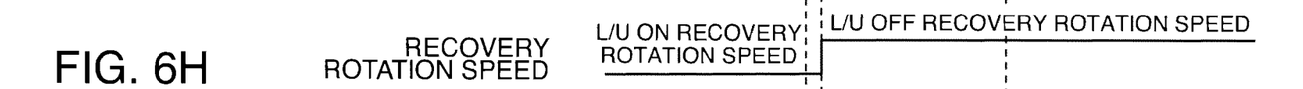
Figure 6I:
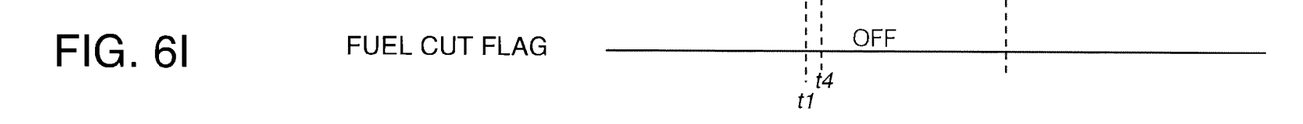

As a result, as illustrated in FIG. 6D, the L/U OFF completion determining countdown timer is switched to "COMPLETE" in the step S6. In addition, in the step S7, as illustrated in FIG. 6H, the recovery rotation speed is switched to the L/U OFF recovery rotation speed of 1600 rpm. As a result of this processing, the fuel-cut operation is suppressed in the subsequent routine execution. Specifically, after the timing t1, the fuel-cut flag is maintained in the "OFF" state as illustrated in FIG. 4H. Therefore, the fuel recovery operation immediately after the unlocking of the lockup clutch 2C is not performed, and a torque shock due to the fuel recovery operation immediately after the unlocking of the lockup clutch 2C is not generated.

Thereafter, unless the determination of the step S2 changes to be negative, or in other words as long as there is no instruction of locking the lockup clutch 2C, the recovery rotation speed is maintained at the L/U OFF recovery rotation speed, and the fuel supply to the internal combustion engine 1 is continuously performed.

Figure 8:
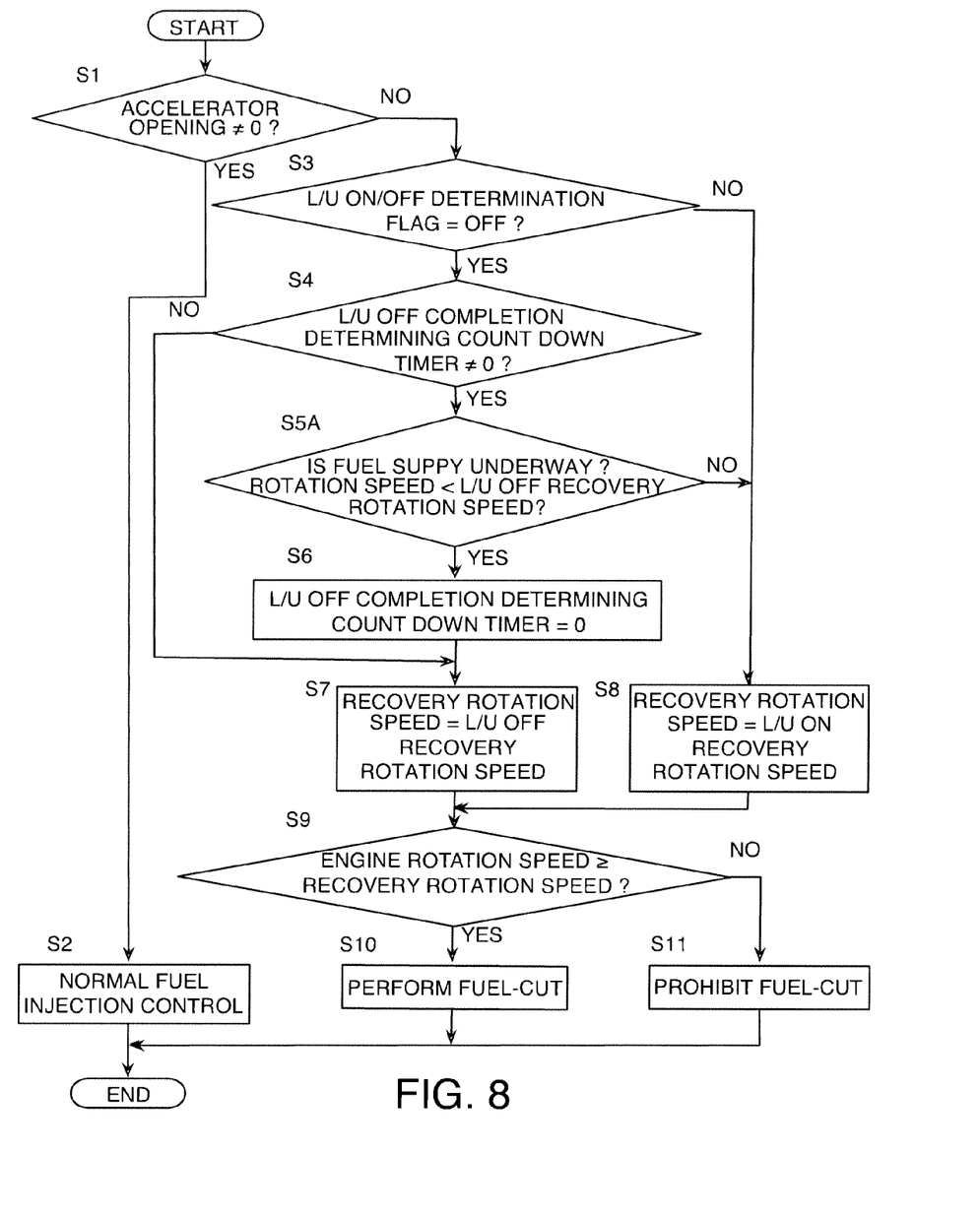
FIG. 8 is a flowchart illustrating a driving force control routine executed by an engine controller according to a third embodiment of this invention.

Referring to FIG. 8 next, a driving force control routine according to a third embodiment of this invention will be described. This driving force control routine executes a step S5A instead of the step S5 of the driving force control routine of FIG. 5. The other steps and execution conditions of the routine are identical to those of the driving force control routine of FIG. 5.

In the step S5A, the determination as to whether or not the ignition timing retard amount is equal to or smaller than the predetermined value in the step S5 is omitted.

If the fuel-cut operation is not currently performed, and the engine rotation speed is equal to or lower than the L/U OFF recovery rotation speed, the ECU 4 predicts that the fuel recovery operation will be performed if the fuel-cut operation and unlocking the lockup clutch 2C are performed. In this case, similar to the routine of FIG. 5, the ECU 4 performs the processing of the step S6 and the subsequent steps.

According to this driving force control routine, as a result of the fuel-cut operation and the unlocking of the lockup clutch 2C, prediction of the fuel recovery operation is performed regardless of the ignition timing retard amount. As a result, a case where the fuel recovery operation is predicted increases. This driving force control routine may be inferior to the driving force control routine of FIG. 5 in accuracy of prediction as to whether or not it is really necessary to suppress the fuel-cut operation. Meanwhile, this driving force control routine can be applied to an internal combustion engine that does not retard the ignition timing before the fuel-cut operation. In other words, according to this embodiment, it is possible to widen an applicable range of this invention.

As described above, according to this invention, it is possible to prevent a torque shock caused by the fuel recovery operation during a vehicle coasting without applying regenerative braking.

The contents of Tokugan 2011-200190, with a filing date of Sep. 14, 2011 in Japan, are hereby incorporated by reference.

Although this invention has been described above with reference to certain embodiments, this invention is not limited to the embodiments described above. Modifications and variations of the embodiments described above will occur to those skilled in the art, within the scope of the claims.

For example, in each of the embodiments described above, the recovery rotation speed is increased to the L/U OFF recovery rotation speed when the fuel-cut suppression conditions are satisfied. As a result, it is possible to control the fuel recovery operation based on the locking/unlocking state of the lockup clutch 2C. However, in the step S105 or S7, the recovery rotation speed is not necessarily set equal to the L/U OFF recovery rotation speed. As long as the recovery rotation speed is increase corrected when the fuel recovery operation is predicted, the fuel-cut operation can be restricted.

In addition, in each of the embodiments described above, the fuel recovery operation is suppressed by correcting the recovery rotation speed. As a result, it is possible to suppress the fuel-cut operation without changing the basic algorithm of the steps S107 to S109 or the steps S9 to S11 for performing the fuel-cut operation and the fuel recovery operation of the fuel injector 1B. However, it is also possible to modify the routine such that a signal for instructing the fuel recovery operation is directly output to the fuel injector 1B when the fuel-cut suppression conditions are satisfied.

In the vehicle-driving device according to this invention, it is possible to prevent a shock caused by the fuel recovery operation performed after the fuel-cut operation when a driver releases the accelerator pedal during a vehicle running. According to this invention, therefore, it is possible to improve a vehicle-driving feeling.

The embodiments of this invention in which an exclusive property or privilege is claimed are defined as follows:

The invention claimed is:

1. A vehicle-driving device comprising:
    an internal combustion engine;
    a torque converter with a lockup clutch and an automatic transmission disposed in a motive force transfer path from the internal combustion engine to a drive wheel of a vehicle; and
    a programmable controller programmed to:
        perform a fuel-cut operation to stop fuel supply to the internal combustion engine and cause the lockup clutch to perform an unlock operation, when an accelerator pedal of the vehicle is released while the vehicle is running;
        predict if a fuel recovery operation to resume fuel supply to the internal combustion engine is to be performed as a result of the fuel-cut operation and the unlock operation; and
        prohibit the fuel-cut operation from being performed when the fuel recovery operation is predicted to be performed as a result of the fuel-cut operation and the unlock operation.

2. The vehicle-driving device according to claim 1, wherein the controller is further programmed to:
    perform a torque down operation of the internal combustion engine to gradually decrease an output torque thereof;
    prohibit the fuel-cut operation from being performed when the fuel recovery operation is predicted to be performed as a result of the fuel-cut operation and the unlock operation and a torque down amount due to the torque down operation is smaller than a predetermined amount; and
    not to prohibit the fuel-cut operation when the fuel recovery operation is predicted to be performed as a result of the fuel-cut operation and the unlock operation and a torque down amount due to the torque down operation is greater than a predetermined amount.

3. A vehicle-driving device that transmits a rotation of an internal combustion engine that is responsive to a depression amount of an accelerator pedal to a drive wheel of a vehicle via a torque converter and an automatic transmission, comprising:
    a lockup clutch that performs a lockup and an unlock operations of the torque converter;
    an accelerator pedal depression sensor that detects a release of the accelerator pedal;

an engine rotation speed sensor that detects an engine rotation speed of the internal combustion engine; and a programmable controller programmed to:
- cause the lockup clutch to perform the unlock operation when the release of the accelerator pedal is detected while the vehicle is running;
- perform a fuel-cut operation to stop fuel supply to the internal combustion engine when the engine rotation speed is equal to or greater than a predetermined recovery rotation speed in a state where the accelerator pedal is released;
- perform a fuel recovery operation to resume fuel supply to the internal combustion engine when the engine rotation speed falls below the predetermined recovery rotation speed during the fuel-cut operation;
- predict if the fuel recovery operation is to be performed as a result of the fuel-cut operation and the unlock operation;
- suppress the fuel-cut operation from being performed when the fuel recovery operation is predicted to be performed as a result of the fuel-cut operation and the unlock operation.

4. The vehicle-driving device according to claim 3, wherein the controller is further programmed to:
- selectively apply a lockup clutch ON recovery rotation speed that is applied when the lockup clutch is in a lockup state and a lockup clutch OFF recovery rotation speed that is higher than the lockup clutch ON recovery rotation speed and applied when the lockup clutch is in the unlock state, to the recovery rotation speed in response to an operation state of the lockup clutch; and
- suppress the fuel-cut operation from being performed by altering the predetermined recovery rotation speed to the lockup clutch OFF recovery rotation speed from the lockup clutch ON recovery rotation speed.

5. The vehicle-driving device according to claim 4, wherein the controller is further programmed not to predict that the fuel recovery operation is to be performed as a result of the fuel-cut operation and the unlock operation as long as the engine rotation speed does not fall below the lockup clutch OFF recovery rotation speed.

6. The vehicle-driving device according to claim 3, wherein the internal combustion engine comprises a fuel injector and the controller is further programmed to retard an ignition timing of fuel injected by the fuel injector preceding the fuel-cut operation and not to predict that the fuel recovery operation is to be performed as a result of the fuel-cut operation and the unlock operation as long as a retard amount of the ignition timing does not fall below a predetermined amount.

7. A vehicle-driving device comprising:
an internal combustion engine;
a torque converter with a lockup clutch and an automatic transmission disposed in a motive force transfer path from the internal combustion engine to a drive wheel of a vehicle;
means for performing a fuel-cut operation to stop fuel supply to the internal combustion engine and cause the lockup clutch to perform an unlock operation, when an accelerator pedal of the vehicle is released while the vehicle is running;
means for predicting if a fuel recovery operation to resume fuel supply to the internal combustion engine is to be performed as a result of the fuel-cut operation and the unlock operation; and
means for prohibiting the fuel-cut operation from being performed when the fuel recovery operation is predicted to be performed as a result of the fuel-cut operation and the unlock operation.

8. A driving method for a vehicle, the vehicle comprising an internal combustion engine, and a torque converter with a lockup clutch and an automatic transmission that are disposed in a motive force transfer path from the internal combustion engine to a drive wheel of a vehicle, the method comprising:
- performing a fuel-cut operation to stop fuel supply to the internal combustion engine and causing the lockup clutch to perform an unlock operation, when an accelerator pedal of the vehicle is released while the vehicle is running;
- predicting if a fuel recovery operation to resume fuel supply to the internal combustion engine is to be performed as a result of the fuel-cut operation and the unlock operation; and
- prohibiting the fuel-cut operation from being performed when the fuel recovery operation is predicted to be performed as a result of the fuel-cut operation and the unlock operation.

* * * * *